United States Patent
Fleming et al.

(10) Patent No.: US 12,556,583 B2
(45) Date of Patent: Feb. 17, 2026

(54) LABEL-BASED DATA GOVERNANCE ENFORCEMENT FOR DECENTRALIZED SYSTEMS

(71) Applicant: Cisco Technology, Inc., San Jose, CA (US)

(72) Inventors: Charles Fleming, Oxford, MS (US); Ramana Rao V. R. Kompella, Foster City, CA (US); Bozidar-Brannan Evgeni Kovachev, Verona, WI (US)

(73) Assignee: Cisco Technology, Inc., San Jose, CA (US)

(*) Notice: Subject to any disclaimer, the term of this patent is extended or adjusted under 35 U.S.C. 154(b) by 129 days.

(21) Appl. No.: 18/381,289

(22) Filed: Oct. 18, 2023

(65) Prior Publication Data

US 2025/0133115 A1 Apr. 24, 2025

(51) Int. Cl.
*H04L 9/40* (2022.01)
*H04L 67/561* (2022.01)

(52) U.S. Cl.
CPC ............ *H04L 63/20* (2013.01); *H04L 67/561* (2022.05)

(58) Field of Classification Search
CPC .............................. H04L 63/20; H04L 67/561
See application file for complete search history.

(56) References Cited

U.S. PATENT DOCUMENTS

| | | | |
|---|---|---|---|
| 11,736,564 B1 | 8/2023 | Jain et al. | |
| 12,255,875 B2 * | 3/2025 | Lenrow | H04L 41/0893 |
| 2008/0184336 A1 | 7/2008 | Sarukkai et al. | |
| 2019/0394175 A1 | 12/2019 | Zhang et al. | |
| 2021/0211408 A1 * | 7/2021 | Porras | G06N 3/045 |
| 2022/0070279 A1 * | 3/2022 | Pang | H04L 67/133 |
| 2022/0271936 A1 | 8/2022 | Doney | |
| 2023/0231912 A1 * | 7/2023 | Vohra | H04L 67/561 |
| | | | 709/217 |
| 2024/0406169 A1 * | 12/2024 | Prunier | H04L 63/0807 |

FOREIGN PATENT DOCUMENTS

WO 2018201009 A1 11/2018

OTHER PUBLICATIONS

Microsoft: "Data Classification Sensitivity Label Taxonomy", Microsoft Service Assurance, Article, Mar. 2, 2023, 3 Pages.
Microsoft: "Learn about Sensitivity Labels", Microsoft Learn, Article, Sep. 15, 2023, 17 Pages.

* cited by examiner

*Primary Examiner* — Kristie D Shingles
(74) *Attorney, Agent, or Firm* — Lee & Hayes, P.C.

(57) ABSTRACT

In one embodiment, a sidecar proxy executed by a device extracts label information from input data for input to a microservice associated with the sidecar proxy indicative of a lineage of the input data. The sidecar proxy makes, based on the label information, a determination as to whether the microservice processing the input data would violate a data governance policy. The sidecar proxy provides, based on the determination, the input data to the microservice. The sidecar proxy tags output data generated by the microservice with appended label information that includes the label information extracted from the input data and an indication of a data transformation performed by the microservice to the input data to form the output data.

20 Claims, 6 Drawing Sheets

LABEL-BASED DATA GOVERNANCE ENFORCEMENT FOR DECENTRALIZED SYSTEMS

TECHNICAL FIELD

The present disclosure relates generally to computer networks, and, more particularly, to label-based data governance enforcement for decentralized systems.

BACKGROUND

As machine learning/artificial intelligence techniques continue to evolve and mature, the number of use cases for these techniques also continue to increase. For instance, video analytics techniques are becoming increasingly ubiquitous as a complement to new and existing surveillance systems. In such deployments, a neural network-based person detection and reidentification now allows for a specific person to be tracked across different video feeds throughout a location. More advanced video analytics techniques also attempt to detect certain types. Other use cases also range from sensor analytics, to (semi-) autonomous vehicles, to network security, to name a few.

With the large variety of types of data now being collected for use in data pipelines, it has become increasingly challenging to comply with the numerous data governance requirements for that data and any data derived therefrom. These requirements stem from sources ranging from laws, to administrative regulations, to industry standards, to contractual obligations, among others. For instance, the General Data Protection Regulation (GDPR) in Europe strictly controls how personal data may be stored and used, including the right of users to request that their data be deleted.

Thus, compliance with many data governance requirements begins with implementing mechanisms to determine the provenance and lineage of data in a system. In centralized systems, this is relatively trivial. However, in edge systems, the data may originate from a much larger number of sources and processed through a series of microservices, each of which may be located in a different location subject to different policies.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

According to one or more implementations, a sidecar proxy executed by a device extracts label information from input data for input to a microservice associated with the sidecar proxy indicative of a lineage of the input data. The sidecar proxy makes, based on the label information, a determination as to whether the microservice processing the input data would violate a data governance policy. The sidecar proxy provides, based on the determination, the input data to the microservice. The sidecar proxy tags output data generated by the microservice with appended label information that includes the label information extracted from the input data and an indication of a data transformation performed by the microservice to the input data to form the output data.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. Other types of networks, such as field area networks (FANs), neighborhood area networks (NANs), personal area networks (PANs), etc. may also make up the components of any given computer network.

In various implementations, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or wired networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
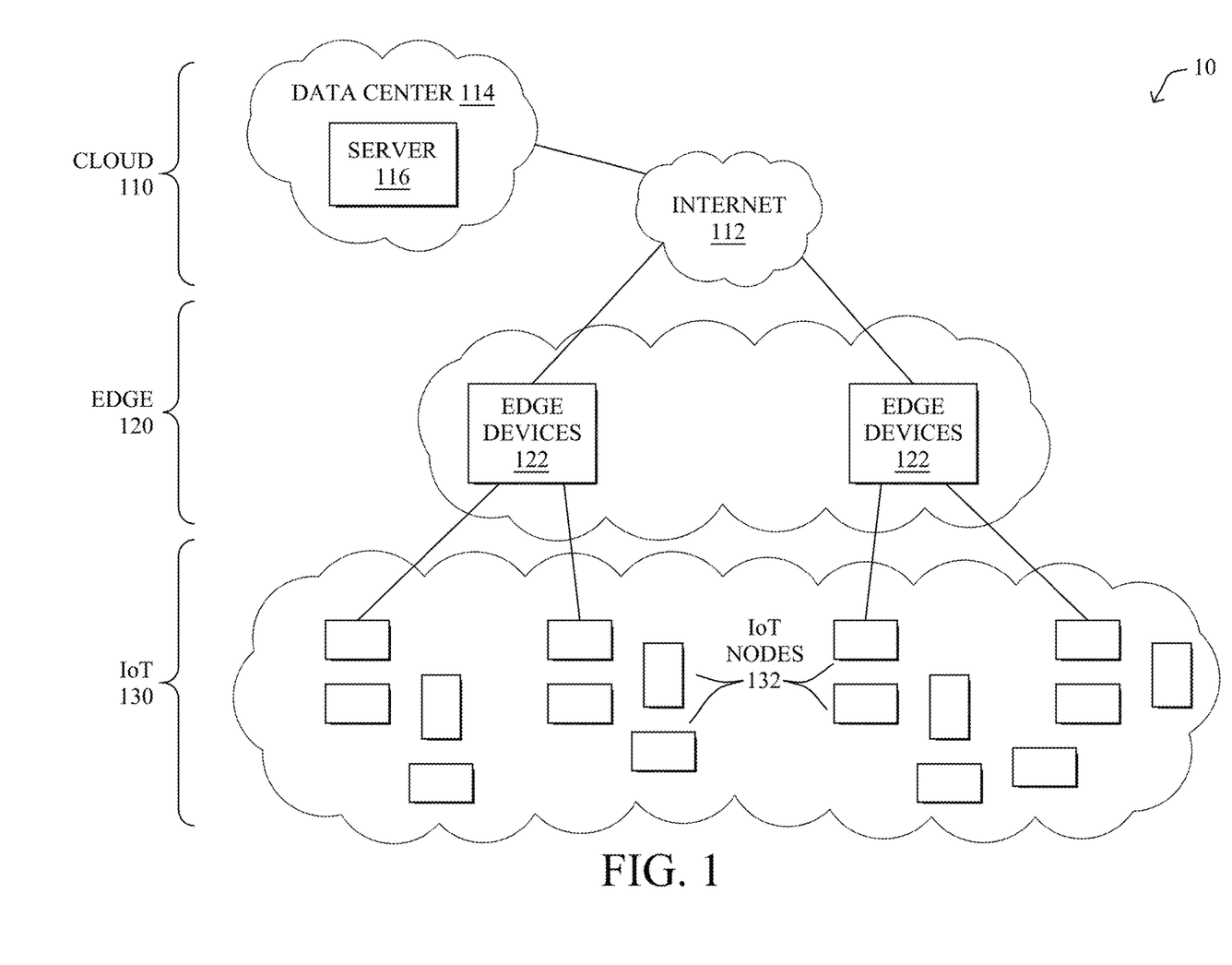
FIG. 1 illustrate an example network.

FIG. 1 is a schematic block diagram of an example simplified computer network 100 illustratively comprising nodes/devices at various levels of the network, interconnected by various methods of communication. For instance, the links may be wired links or shared media (e.g., wireless links, wired links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), or other shared-media protocols where appropriate. In this context, a protocol consists of a set of rules defining how the nodes interact with each other.

Figure 2:
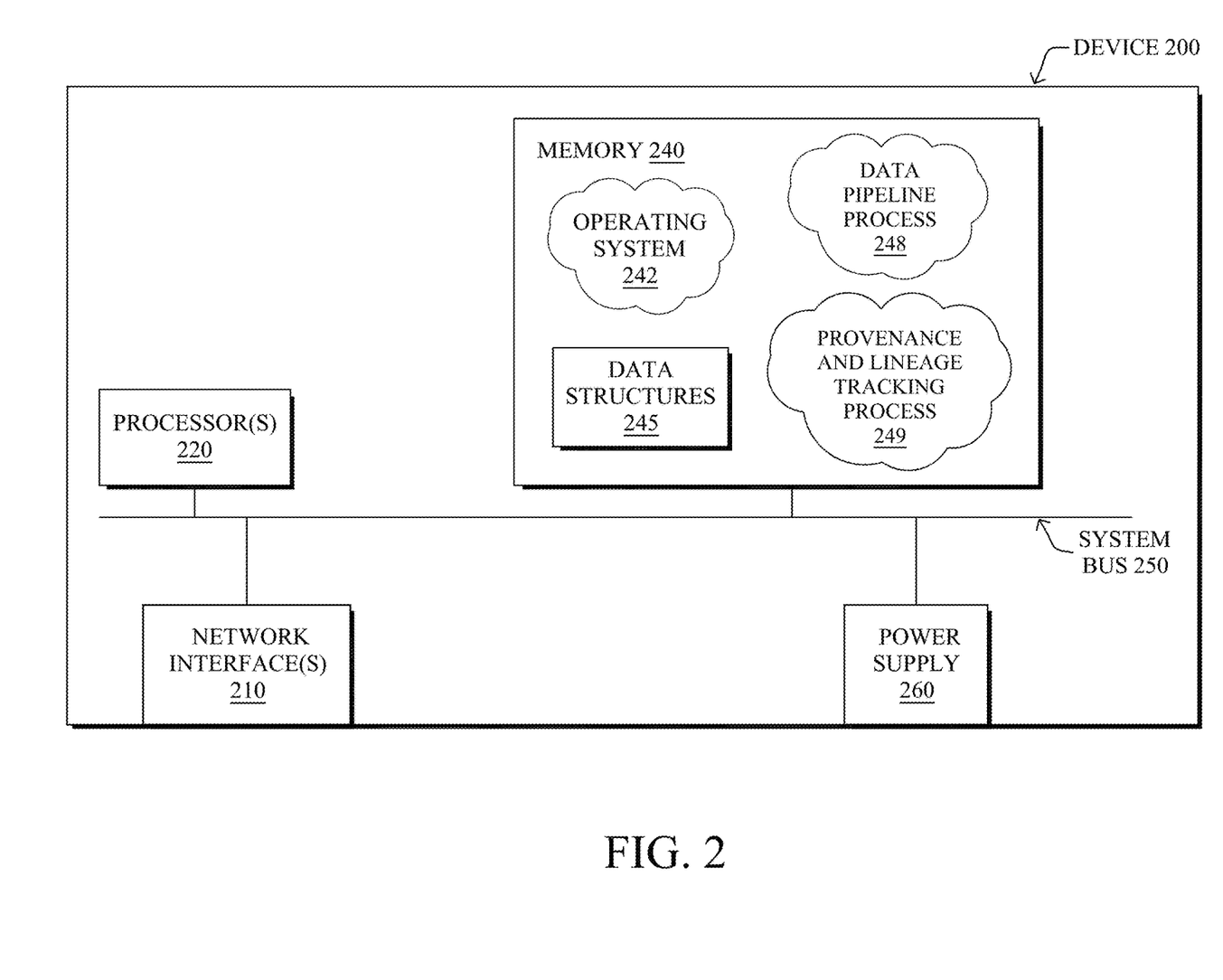
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration.

The memory 240 comprises a plurality of storage locations that are addressable by the processor 220 and the network interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative data pipeline process 248 and/or provenance and lineage tracking process 249, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various implementations, data pipeline process 248 and/or provenance and lineage tracking process 249 may employ one or more supervised, unsupervised, or self-supervised machine learning models. Generally, supervised learning entails the use of a training set of data that is used to train the model to apply labels to the input data. For example, the training data may include sample video data depicting a particular event that has been labeled as such. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Self-supervised learning models take a middle ground approach that uses a greatly reduced set of labeled training data.

Example machine learning techniques that data pipeline process 248 and/or provenance and lineage tracking process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

In further implementations, data pipeline process 248 and/or provenance and lineage tracking process 249 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, data pipeline process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that assesses video data to identify a certain type of object or event. In such a case, the false positives of the model may refer to the number of times the model incorrectly flagged the video data as depicting the type of object or event. Conversely, the false negatives of the model may refer to the number of times the model incorrectly determined that the video data does not depict the type of object or event. True negatives and positives may refer to the number of times the model correctly identified the video as not depicting the object/event or depicting it, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
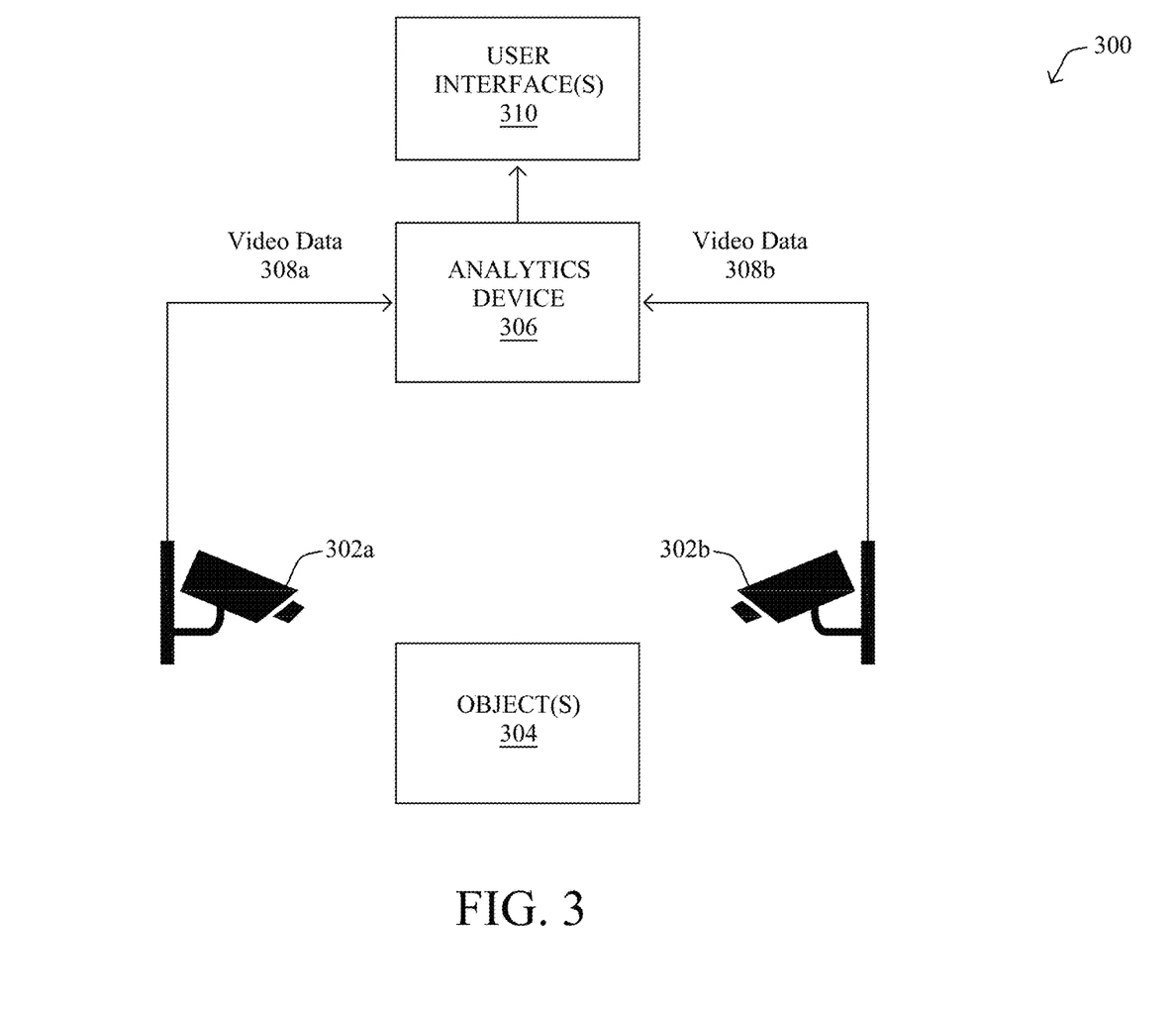
FIG. 3 illustrates an example system for performing video analytics.

FIG. 3 illustrates an example system 300 for performing video analytics, as described in greater detail above. As shown, there may be any number of cameras 302 deployed to a physical area, such as cameras 302a-302b. Such surveillance is now fairly ubiquitous across various locations including, but not limited to, public transportation facilities (e.g., train stations, bus stations, airports, etc.), entertainment facilities (e.g., sports arenas, casinos, theaters, etc.), schools, office buildings, and the like. In addition, so-called "smart" cities are also now deploying surveillance systems for purposes of monitoring vehicular traffic, crime, and other public safety events.

Regardless of the deployment location, cameras 302a-302b may generate and send video data 308a-308b, respectively, to an analytics device 306 (e.g., a device 200 executing data pipeline process 248 and/or provenance and lineage tracking process 249 in FIG. 2). For instance, analytics device 306 may be an edge device (e.g., an edge device 122 in FIG. 1), a remote server (e.g., a server 116 in FIG. 1), or may even take the form of a particular endpoint in the network, such as a dedicated analytics device, a particular camera 302, or the lie.

In general, analytics device 306 may be configured to provide video data 308a-308b for display to one or more user interfaces 310, as well as to analyze the video data for events that may be of interest to a potential user. To this end, analytics device 306 may perform object detection on video data 308a-308b, to detect and track any number of objects 304 present in the physical area and depicted in the video data 308a-308b. In some implementations, analytics device 306 may also perform object re-identification on video data 308a-308b, allowing it to recognize an object 304 in video data 308a as being the same object in video data 308b or vice-versa.

As noted above, artificial intelligence/machine learning presents a wide variety of use cases, ranging from video analytics, to (semi-) autonomous vehicles, to network security, and beyond. One challenge, though, relates to the computational resources needed to execute large models. This is particularly true with respect to using a machine learning model to make inferences at a device with limited resources, such as an edge device (e.g., an edge device 122).

With the large variety of types of data now being collected for use in data pipelines, it has become increasingly challenging to comply with the numerous data governance requirements for that data and any data derived therefrom. These requirements stem from sources ranging from laws, to administrative regulations, to industry standards, to contractual obligations, among others. For instance, the General Data Protection Regulation (GDPR) in Europe strictly controls how personal data may be stored and used, including the right of users to request that their data be deleted.

Thus, compliance with many data governance requirements begins with implementing mechanisms to determine the provenance and lineage of data in a system. In centralized systems, this is relatively trivial. However, in edge systems, the data may originate from a much larger number of sources and processed "on site" through a series of microservices. For instance, in the case of FIG. 3, analytics device 306 may take the form of multiple devices that operate in a distributed manner to perform any number of video analytics tasks. Similar deployments may be implemented to assess other types of input data, as well, such as different types of sensor data, data captured regarding the computer network itself, or the like.

—Label-Based Data Governance Enforcement for Decentralized Systems—

The techniques herein provide for fine-grained data governance enforcement for decentralized systems, such as edge computing systems. In some aspects, a sidecar proxy may be configured to perform this enforcement, essentially filtering which input data is allowed to pass to an associated microservice.

Illustratively, the techniques described herein may be performed by hardware, software, and/or firmware, such as in accordance with the data pipeline process 248 and/or provenance and lineage tracking process 249, which may include computer executable instructions executed by the processor 220 (or independent processor of interfaces 210), to perform functions relating to the techniques described herein.

Specifically, according to various implementations, a sidecar proxy executed by a device extracts label information from input data for input to a microservice associated with the sidecar proxy indicative of a lineage of the input data. The sidecar proxy makes, based on the label information, a determination as to whether the microservice processing the input data would violate a data governance policy. The sidecar proxy provides, based on the determination, the input data to the microservice. The sidecar proxy tags output data generated by the microservice with appended label information that includes the label information extracted from the input data and an indication of a data transformation performed by the microservice to the input data to form the output data.

Figure 4:
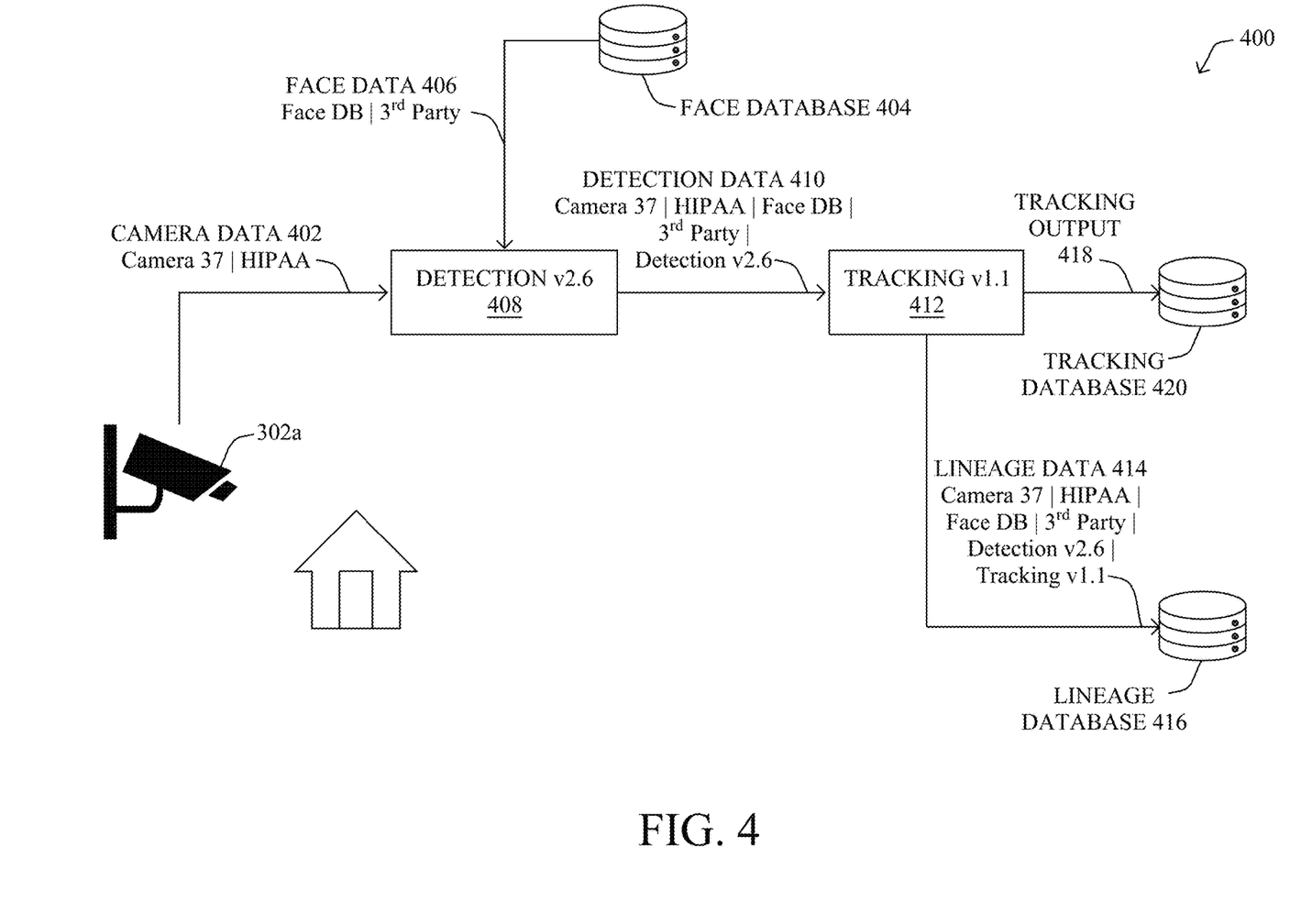
FIG. 4 illustrates an example of decentralized data provenance and lineage tracking.

Operationally, FIG. 4 illustrates an example 400 of decentralized data provenance and lineage tracking, according to various implementations. Continuing the example of FIG. 3, again assume that a camera 302a captures video data depicting any number of objects 304. In some implementations, camera 302a may execute provenance and lineage tracking process 249 to tag the camera data 402 from camera 302a with the identity of camera 302a (e.g., "camera 37") and any data governance policies that may apply to camera data 402. For instance, the Health Insurance Portability and Accountability Act (HIPAA) that regulates how personally identifiable information maintained by healthcare organizations can be stored and shared. In some instances, camera 302a may cryptographically sign camera data 402 using cryptographic information unique to camera 302a, thereby forming a cryptographic chain of proof that camera data 402 indeed originated from camera 302a.

As shown, camera 302a may provide the resulting camera data 402 to a data pipeline that includes any number of modules (e.g., sub-components of data pipeline process 248) that perform tasks such as data analytics, data storage, data transformation, and the like. These modules may be executed by edge devices or any other form of distributed computing nodes in a network. By way of example, assume that camera 302a sends camera data 402 to detection module 408 (e.g., a microservice) that is configured to execute a first portion of an application that takes the form of a detection module 408.

In general, detection module 408 may be configured to perform video analytics on camera data 402, to detect the presence of a person and/or identify the presence of a particular person depicted in camera data 402. To do so, detection module 408 may receive face data 406 from a database 404 of facial data and compare face data 406 to camera data 402. For instance, in some instances, detection module 408 may leverage a CNN or other machine learning model trained using face data 406 to perform its detection operation on camera data 402.

In turn, detection module 408 may then provide detection data 410 that results from its operation to another portion of the application, tracking module 412, that is responsible for performing another operation: tracking an identified person depicted in camera data 402 over time. In some instances, tracking module 412 may be even executed by another device than that executing detection module 408 (e.g., another router, etc.). Tracking module 412 then stores the resulting tracking output 418 in a tracking database 420. For instance, tracking database 420 may allow security personnel to review, via a display, the portions of camera data 402 that depict the movement of a particular person over time.

Depending on the location or type of deployment environment for camera 302a, one or more data governance policies may be applicable to the capture, storage, and/or use of camera data 402. For instance, as shown, assume that camera 302a may be deployed in a medical facility, meaning that Health Insurance Portability and Accountability Act (HIPAA) may be applicable to camera data 402. To ensure compliance with this and any other data governance policy that applies to camera data 402, the techniques herein propose camera 302a being configured to generate label data that is sent as part of camera data 402 to detection module 408.

During deployment of camera 302a and/or whenever there is a change to the set of one or more data governance policies that apply to camera data 402, camera 302a may be configured to include the following in the label data of camera data 402:

An indication that camera 302a was the source of camera data 402. For instance, such an indication may take the form of a network address, unique identifier for camera 302a, or the like. In other instances, camera 302a may cryptographically sign camera data 402, allowing a receiving device, such as the one executing detection module 408, to verify the identity of camera 302a.

The data governance policy or policies that apply to camera data 402.

Any additional metadata that may control how camera data 402 may be used along the data pipeline.

In response to receiving camera data 402, the device executing detection module 408 may extract the label information from camera data 402, to determine which data governance policies apply to it. In some implementations, the device executing detection module 408 may do so by executing provenance and lineage tracking process 249 in a sidecar proxy associated with detection module 408. In addition, in some implementations, instrumentation code may be inserted into that of detection module 408 to allow provenance and lineage tracking process 249 to control its execution. For instance, doing so may allow for the sidecar proxy to handle the selective passing of camera data 402 to detection module 408 or the selective processing thereof, thereby enforcing any data governance policies indicated by the label data of camera data 402.

As shown, face data 406 may similarly include label data that indicates that its source was database 404 and that a data governance policy regarding the use of $3^{rd}$ party data by the system. In turn, provenance and lineage tracking process 249 may perform a similar analysis to control the use of face data 406 by detection module 408.

Once detection module 408 has performed its analysis of camera data 402, thereby transforming camera data 402 into detection data 410, it may include combined label information that combines the label information of camera data 402 with that of face data 406. In addition, in some implementations, the combined label information for detection data 410 may also indicate the data operation performed on camera data 402 by detection module 408, as well as potentially the version of detection module 408 (e.g., version v2.6).

Next, when the device executing tracking module 412 receives detection data 410, its own provenance and lineage tracking process 249 may similarly perform its own analysis on the label data of detection data 410, to control how tracking module 412 processes detection data 410, if at all. In addition, and similar to the label processing performed by the device that executes detection module 408, the device executing tracking module 412 may generate lineage data 414 that aggregates the label information from detection data 410. In some cases, information regarding tracking module 412 may also be included in lineage data 414, which is then stored in a lineage database 416. This allows a user reviewing data in tracking database 420 to also review its corresponding lineage data from lineage database 416, accordingly.

Figure 5:
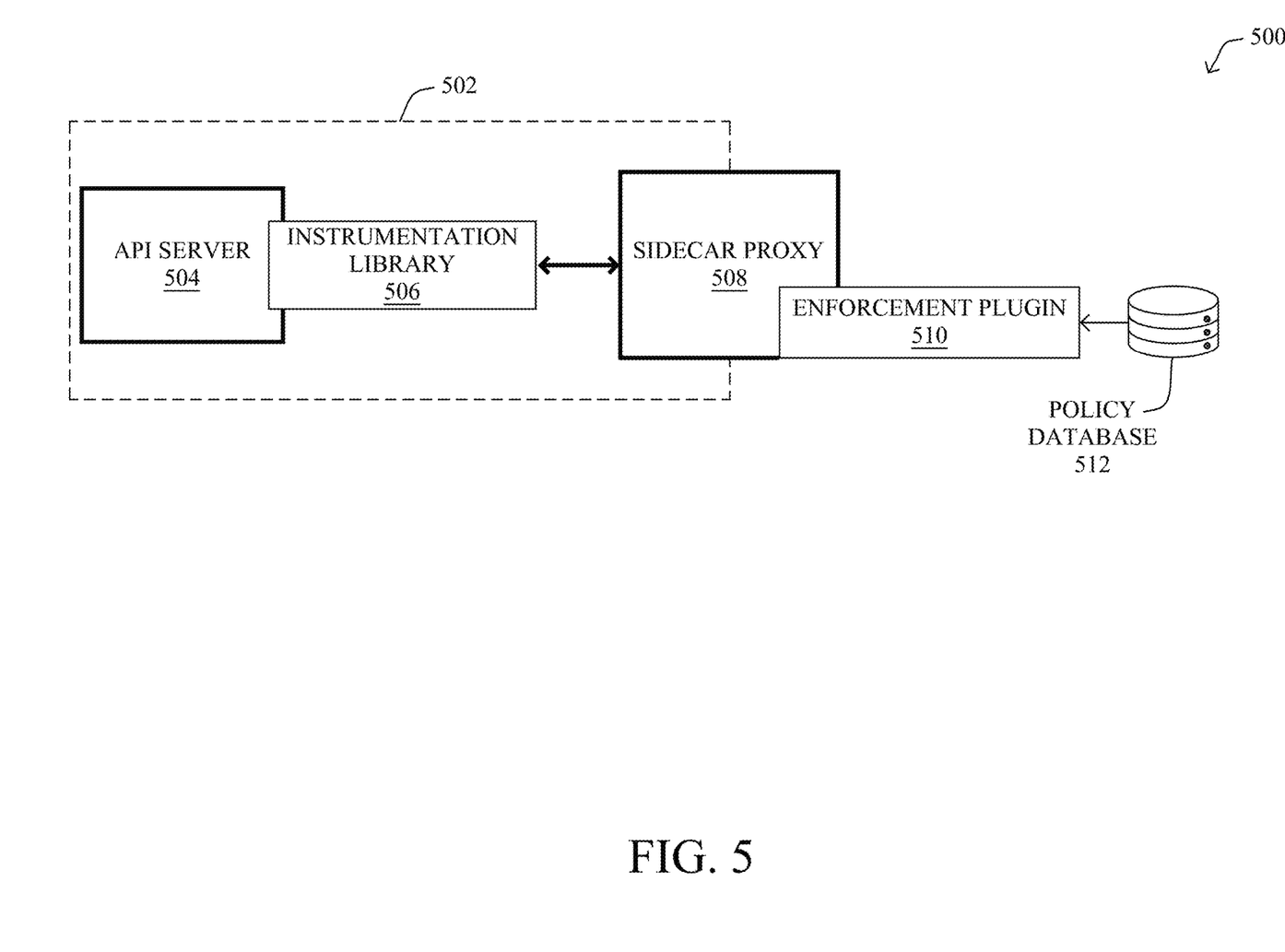
FIG. 5 illustrates an example of a sidecar proxy performing label-based data governance enforcement.

FIG. 5 illustrates an example 500 of a sidecar proxy performing label-based data governance enforcement, in various implementations. Continuing the example of FIG. 4, assume again that there are multiple, distributed devices/nodes, each of which may perform a data transformation of the data being passed along the data pipeline. For instance, as shown, assume that there is a device/node 502 that includes an Application Programming Interface (API) server 504 that is implemented via a microservice executed by 502 as part of the distributed computing system. For instance, API server 504 may implement detection module 408 or tracking module 412 in FIG. 4. Of course, other microservices may also be implemented in a similar manner.

In various embodiments, associated with the microservice of node 502 may be a sidecar proxy 508 that is responsible for performing the data governance enforcement with respect to input data being sent to API server 504 and/or any output data from API server 504 to be sent to another device/node in the distributed system (e.g., through execution of provenance and lineage tracking process 249). For instance, sidecar proxy 508 may interface with API server 504 via an instrumentation library 506, effectively functioning as a go-between between the microservice and other microservices. As would be appreciated, sidecar proxy 508 may also implement other functions that are typically offloaded to sidecar proxies, as well, such as networking functions, traffic security functions, and the like.

To enforce the various policies that may apply to a given set of input data for API server 504, sidecar proxy 508 may include an enforcement plugin 510 that allows a policy database 512 to send data governance policies to sidecar proxy 508 for enforcement. In some implementations, these policies may be composited into a single policy for the current data, and sidecar proxy 508 may use the aggregate policy to determine whether sending input data received by node 502 for input to API server 504 would violate any of the policies. If so, sidecar proxy 508 may block that data from being passed to API server 504 and potentially raise an error, as well. Conversely, if sidecar proxy 508 determines that no such policy violation would occur, sidecar proxy 508 may then pass the input data to API server 504 for processing.

To determine whether a policy violation would occur, sidecar proxy 508 may do so by extracting the tag information from the incoming data and comparing the tags to the policies from policy database 512. For instance, sidecar proxy 508 may compare the type of data transformation performed by API server 504, the type of input data, the source of the input data, the location of node 502 and/or that of the source of the input data, the one or more policies indicated by the tag information and/or from policy database 512, etc., to determine whether such a violation would occur. In one implementation, sidecar proxy 508 may generate hashes of the label information from the input data and perform a lookup of the hash in a local table of sidecar proxy 508 that lists the currently enforced policy sets. Doing so means having to only pay the cost of checking the enforcement status the first time a new set of labels is encountered.

Another function of sidecar proxy 508 may also be to append additional tagging information to any output data generated by API server 504, as shown in greater detail in FIG. 4. For instance, sidecar proxy 508 may append additional tags to the tag information from the input data indicative of the identity of node 502, the function/transformation performed by API server 504, etc. In turn, sidecar proxy 508 may send the output data from policy database 512 with the aggregated tag information on to the next node in the data pipeline for further processing.

Figure 6:
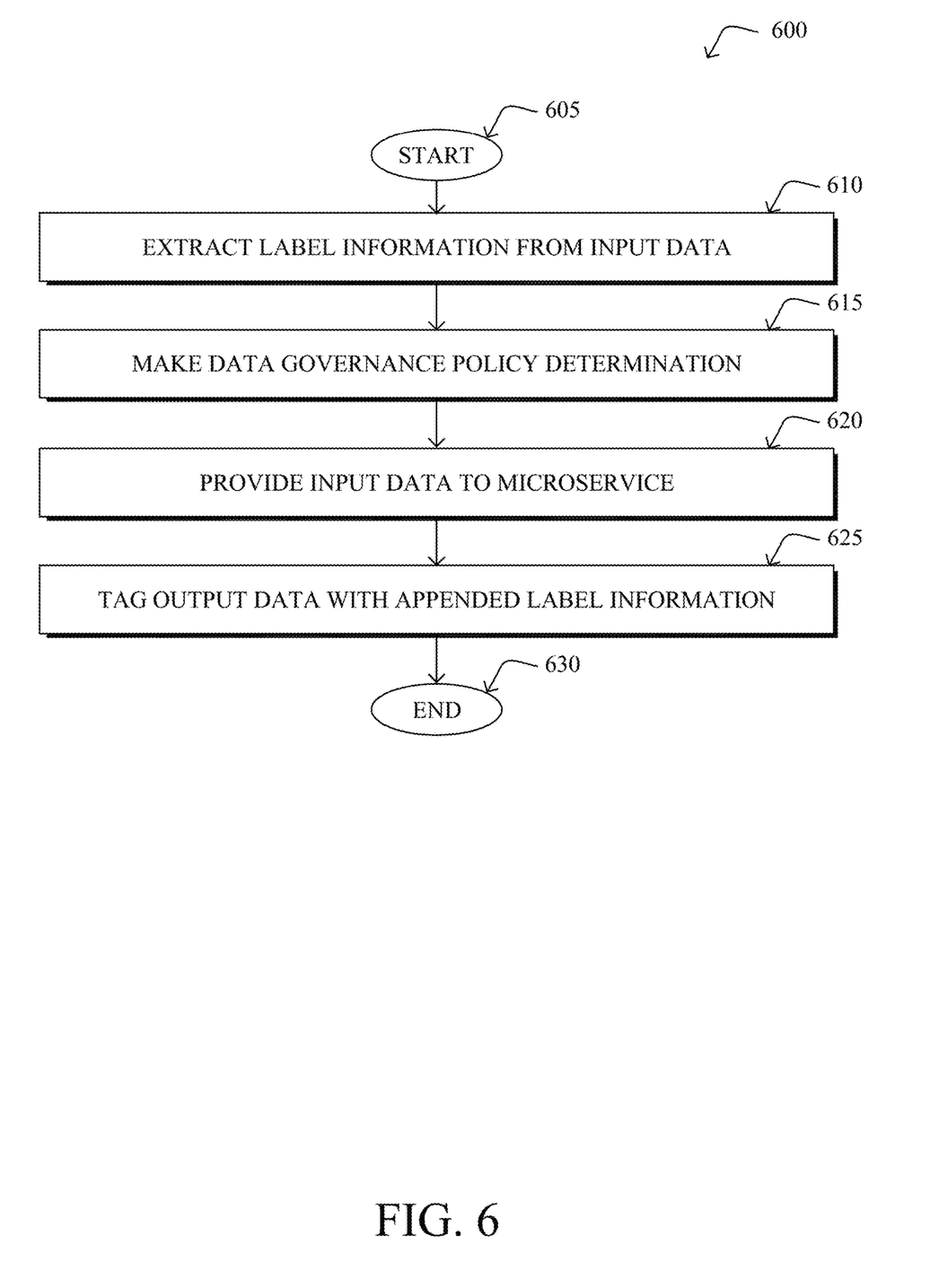
FIG. 6 illustrates an example simplified procedure for label-based data governance enforcement.

FIG. 6 illustrates an example simplified procedure 600 (e.g., a method) for label-based data governance enforcement, in accordance with one or more implementations described herein. For example, a non-generic, specifically configured controller (e.g., device 200) may perform procedure 600 by executing stored instructions (e.g., data pipeline process 248 and/or provenance and lineage tracking process 249). The procedure 600 may start at step 605, and continues to step 610, where, as described in greater detail above, the device may extract, by a sidecar proxy executed by the device, label information from input data for input to a microservice associated with the sidecar proxy indicative of a lineage of the input data. In one implementation, the microservice comprises an application programming interface (API) server. In some cases, the input data comprises sensor data captured by a sensor and its label information comprises an identifier for the sensor. For instance, the sensor may be a camera, such as a surveillance camera.

At step 615, the sidecar proxy may make, based on the label information, a determination as to whether the microservice processing the input data would violate a data governance policy. In various implementations, the sidecar proxy may receive the data governance policy from a policy database. In some instances, the sidecar proxy receives the data governance policy via an enforcement plugin of the sidecar proxy. In one implementation, the sidecar proxy may make the determination by performing a lookup of a hash of the label information in a table that includes an indication of the data governance policy.

At step 620, the sidecar proxy may provide, based on the determination, the input data to the microservice. In various implementations, the sidecar proxy may also prevent a particular set of input data from being provided to the microservice, based on a determination that doing so would violate the data governance policy. In further implementations, the data governance policy restricts the microservice from processing the input data when its label information indicates that it includes a particular type of data.

At step 625, the sidecar proxy may tag output data generated by the microservice with appended label information that includes the label information extracted from the input data and an indication of a data transformation performed by the microservice to the input data to form the output data. In various instances, the sidecar proxy may also send the output data tagged with the appended label information to another device for input to a second microservice.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for label-based data governance enforcement, it is to be understood that various other adaptations and modifications may be made within the spirit and scope of the implementations herein. For example, while certain implementations are described herein with respect to specific use cases for the techniques herein, the techniques can be extended without undue experimentation to other use cases, as well.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof, that cause a device to perform the techniques herein. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method comprising:
   extracting, by a sidecar proxy executed by a device, label information included with input data from the input data for input to a microservice associated with the sidecar proxy indicative of a lineage of the input data;
   making, by the sidecar proxy and based on the label information, a determination as to whether the microservice processing the input data would violate a data governance policy;
   providing, by the sidecar proxy and based on the determination, the input data to the microservice; and
   tagging, by the sidecar proxy, output data generated by the microservice such that appended label information is carried with the output data, the appended label information including the label information extracted from the input data and an indication of a data transformation performed by the microservice to the input data to form the output data.

2. The method as in claim 1, further comprising:
   sending, by the sidecar proxy, the output data tagged with the appended label information to another device for input to a second microservice.

3. The method as in claim 1, further comprising:
   preventing, by the sidecar proxy, a particular set of input data from being provided to the microservice, based on a determination that doing so would violate the data governance policy.

4. The method as in claim 1, further comprising:
   receiving, at the sidecar proxy, the data governance policy from a policy database.

5. The method as in claim 4, wherein the sidecar proxy receives the data governance policy via an enforcement plugin of the sidecar proxy.

6. The method as in claim 1, wherein the microservice comprises an application programming interface (API) server.

7. The method as in claim 1, wherein the input data comprises sensor data captured by a sensor and its label information comprises an identifier for the sensor, wherein the sensor generates the label information and includes the label information with the sensor data.

8. The method as in claim 7, wherein the sensor is a camera.

9. The method as in claim 1, wherein the sidecar proxy makes the determination as to whether the microservice processing the input data would violate the data governance policy by:
   performing a lookup of a hash of the label information in a table that includes an indication of the data governance policy.

10. The method as in claim 1, wherein the data governance policy restricts the microservice from processing the input data when its label information indicates that it includes a particular type of data.

11. An apparatus, comprising:
    a network interface to communicate with a computer network;

a processor coupled to the network interface and configured to execute one or more processes including a first portion of a distributed application; and a memory configured to store a process that is executed by the processor, the process when executed configured to:
- extract, by a sidecar proxy executed by the apparatus, label information included with input data from the input data for input to a microservice associated with the sidecar proxy indicative of a lineage of the input data;
- make, by the sidecar proxy and based on the label information, a determination as to whether the microservice processing the input data would violate a data governance policy;
- provide, by the sidecar proxy and based on the determination, the input data to the microservice; and
- tag, by the sidecar proxy, output data generated by the microservice such that appended label information is carried with the output data, the appended label information including the label information extracted from the input data and an indication of a data transformation performed by the microservice to the input data to form the output data.

12. The apparatus as in claim 11, wherein the process when executed is further configured to:
send, by the sidecar proxy, the output data tagged with the appended label information to another device for input to a second microservice.

13. The apparatus as in claim 11, wherein the process when executed is further configured to:
prevent, by the sidecar proxy, a particular set of input data from being provided to the microservice, based on a determination that doing so would violate the data governance policy.

14. The apparatus as in claim 11, wherein the process when executed is further configured to:
receive, at the sidecar proxy, the data governance policy from a policy database.

15. The apparatus as in claim 14, wherein the sidecar proxy receives the data governance policy via an enforcement plugin of the sidecar proxy.

16. The apparatus as in claim 11, wherein the microservice comprises an application programming interface (API) server.

17. The apparatus as in claim 11, wherein the input data comprises sensor data captured by a sensor and its label information comprises an identifier for the sensor, wherein the sensor generates the label information and includes the label information with the sensor data.

18. The apparatus as in claim 17, wherein the sensor is a camera.

19. The apparatus as in claim 11, wherein the sidecar proxy makes the determination as to whether the microservice processing the input data would violate the data governance policy by:
performing a lookup of a hash of the label information in a table that includes an indication of the data governance policy.

20. A tangible, non-transitory, computer-readable medium storing program instructions that cause a device to execute a process comprising:
- extracting, by a sidecar proxy executed by the device, label information included with input data from the input data for input to a microservice associated with the sidecar proxy indicative of a lineage of the input data;
- making, by the sidecar proxy and based on the label information, a determination as to whether the microservice processing the input data would violate a data governance policy;
- providing, by the sidecar proxy and based on the determination, the input data to the microservice; and
- tagging, by the sidecar proxy, output data generated by the microservice such that appended label information is carried with the output data, the appended label information including the label information extracted from the input data and an indication of a data transformation performed by the microservice to the input data to form the output data.

* * * * *